April 19, 1960 G. J. KNUDSON 2,933,073
DIRECT GASOLINE INJECTION SYSTEM
Filed Oct. 1, 1957 3 Sheets-Sheet 1

POWER   EXHAUST   COMPRESSION   INTAKE

FUEL IN

FUEL IN

*INVENTOR.*
GILTNER J. KNUDSON
BY
Bauer and Seymour
ATTORNEYS

April 19, 1960     G. J. KNUDSON     2,933,073
DIRECT GASOLINE INJECTION SYSTEM

Filed Oct. 1, 1957     3 Sheets-Sheet 3

INVENTOR.
GILTNER J. KNUDSON
BY
Bauer and Seymour
ATTORNEYS

United States Patent Office 2,933,073
Patented Apr. 19, 1960

2,933,073

DIRECT GASOLINE INJECTION SYSTEM

Giltner J. Knudson, Guilford, N.Y., assignor to Bendix Aviation Corporation, Sidney, N.Y., a corporation of Delaware Application October 1, 1957, Serial No. 687,418

11 Claims. (Cl. 123—32)

This invention relates to internal combustion engines and more particularly to fuel supply systems for such engines.

One of the objects of the present invention is to provide a novel system for injecting metered quantities of liquid fuel, such as gasoline, from a supply line directly into the cylinders of a multi-cylinder engine.

Another object of the invention is to provide a novel method for injecting fuel into the cylinders of an engine, which system makes advantageous novel use of the differences in pressure existing in the cylinders at the time of injection.

Still another object is to provide simplified fuel injection apparatus for multi-cylinder internal combustion engines wherein the distribution of fuel to the cylinders is at least in part determined by the existing gas pressures in the cylinders.

A further object is to provide a novel system of the above character which requires fewer parts and units than are used in any systems heretofore contemplated for comparable engines and which reduces the installation space required and the overall weight of the engine.

A still further object is to provide a novel fuel injection system wherein the number of working parts is reduced to a minimum of rugged and reliable parts, thereby increasing the reliability and trouble-free operating life thereof.

Another object is to provide fuel injection apparatus for engines which is better adapted to the attainment of accurate timing and accurate metering over long periods of operation and hence, is normally more efficient in operation than previously known comparable systems.

Another object is to provide a fuel injection system wherein only relatively simple and inexpensive units are required, thereby minimizing both the initial and the maintenance costs thereof.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a diagrammatic view showing parts of a four-stroke cycle engine and one form of fuel injection system therefor embodying the present invention;

Figure 1:
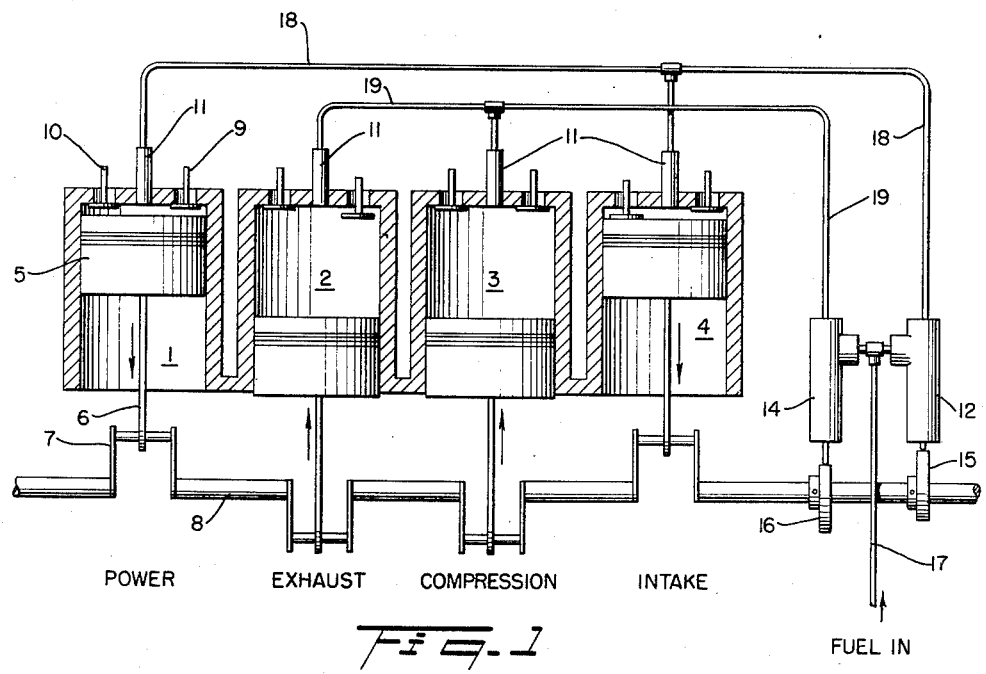

The embodiment of the invention illustrated in Fig. 1 of the drawings, by way of example, is applied to a four-cylinder engine of the four-stroke cycle type, but it is to be understood that the invention is applicable to other sizes and types of multi-cylinder engines. The cylinders of the engine are identified in the drawing from left to right and will be hereinafter referred to as cylinders Nos. 1, 2, 3 and 4. A reciprocating piston 5 in each cylinder is connected by a rod 6 to a crank 7 on the crankshaft 8.

As is common in engines of this type, the cranks on shaft 8 for the pistons in the pair of cylinders 1 and 4 are on the same side of the shaft and the cranks for the pair of cylinders 2 and 3 are on the opposite side of the crankshaft, the two pairs of cranks being relatively displaced by 180°. Thus, the pistons in cylinders 1 and 4, and the pistons in cylinders 2 and 3 work in pairs, moving up and down in their respective cylinders in unison. When one piston of a pair is on its power stroke following injection of fuel and the combustion thereof, the other piston of said pair is on its intake stroke, pulling a fresh charge of air into the cylinder. When one piston of a pair is on its exhaust stroke to expel burned gases from the cylinder, the other piston of that pair is on its compression stroke to compress the fresh charge of air in the cylinder. In a two-cylinder engine the cranks would normally be spaced 180° and in engines having more than four cylinders, the pairs of cranks would be spaced around the shaft by an angle equal to 360° divided by the number of pairs. The cranks of each pair are not necessarily adjacent each other on the shaft.

Each cylinder of the engine is provided in or adjacent to the head thereof with an exhaust valve 9 and an intake valve 10. The exhaust valve ports may connect the cylinders to a suitable exhaust manifold and the intake valve ports may connect the cylinders to an intake manifold. These manifolds are common and well-known in the engine art and are accordingly not shown in the drawings. Likewise, operating mechanisms for the valves are well-known and, hence, are not shown.

Any suitable known type of ignition system may be provided for igniting fuel supplied to the combustion chambers formed by the engine cylinders and the pistons therein. Such an ignition system normally embodies a spark plug in or adjacent the head of each cylinder and means for energizing the spark plug in suitable timed relation to the movements of the pistons in a manner well understood in the art for igniting the compressed fuel-air mixture following the compression stroke of the piston. Since the ignition system does not form a part of the present invention, no part thereof has been illustrated in the drawing.

A novel fuel injection system of the so-called direct injection type is provided by the invention for supplying predetermined metered quantities of fuel, such as gasoline, to the engine cylinders in suitable sequence and in timed relation to the movements of the pistons therein. The system is not only adaptable to multi-cylinder engines having an even number of cylinders wherein the pistons function in sets of two, as above described and as shown in the drawing, but is also adaptable to multi-cylinder engines having one or more sets of a plurality of cylinders in which the air intake portions of the cycle of each cylinder in the set do not substantially overlap. In the form shown, said fuel injection system comprises a pintle type nozzle 11 of known construction for each engine cylinder, the same being mounted in the cylinder head in communication with the combustion chamber. Said nozzles are of any known type embodying a valve 34

Figure 3:
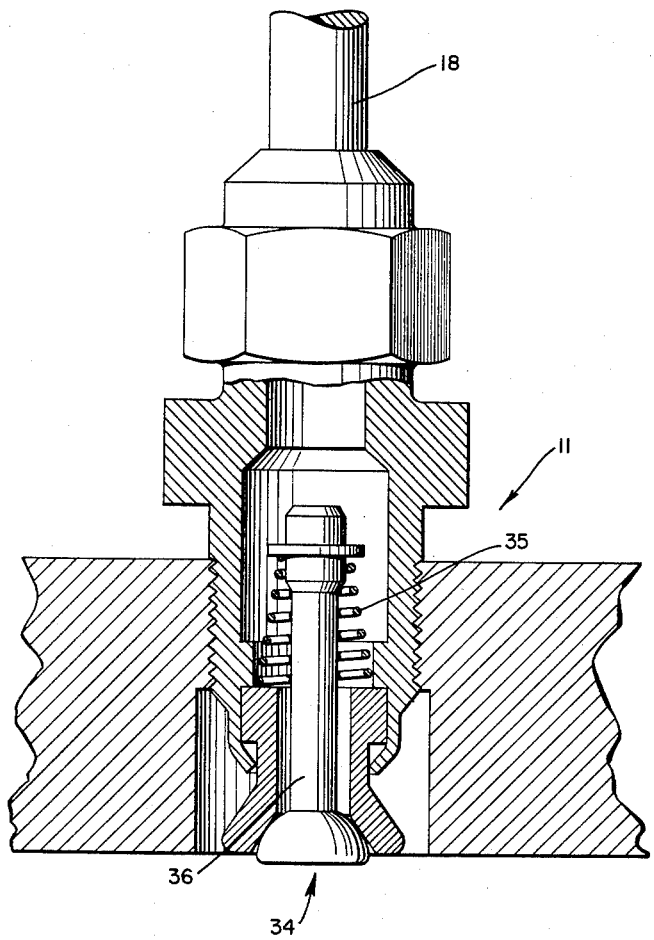
Fig. 3 is a view partially in vertical axial section and partially in elevation of a pressure actuated valve for injecting fuel into the cylinders of an engine in accordance with the present invention.

(Fig. 3) normally closed by spring pressure or the like and adapted to be opened by the pressure of the fuel in the supply line and in opposition to the pressure of the closing spring and the pressure, if any, of the gases in the cylinder combustion chamber. In the valve shown in Fig. 3, a coil compression spring 35 acting between the body of the valve and a stem 36 connected to the movable element of the valve maintains the movable valve element closed against the pressure in pipe 18 except when low pressure conditions exist in the cylinder with which the valve is associated.

In prior known fuel injection systems, either a pump is provided for each engine cylinder or a single pump is used with a distributor for supplying fuel to a plurality of cylinders or combustion chambers. The system contemplated by the invention obviates disadvantages of both of these known systems by providing a single pump for two or more cylinders or combustion chambers of an engine. In the embodiment illustrated in Fig. 1, two single cylinder plunger type fuel pumps 12 and 14 of any suitable known construction are actuated 180° out of phase with each other by cams 15 and 16 on crankshaft 8. Liquid fuel, such as gasoline, is supplied to both pumps from a common fuel supply line 17 and the output of each pump is connected directly to the injection nozzles 11 of a pair of engine cylinders by fuel lines 18 and 19. Thus, pump 12 supplies cylinders 1 and 4, and pump 14 supplies cylinders 2 and 3. The firing order of the engine cylinders is determined by known standards, and in the engine illustrated, the firing order of the cylinders may be 1—3—4—2.

The pumps 12 and 14 are actuated in timed relation with the pistons of the engine in such a manner that when a pump is making an injection stroke, one of the cylinders to which it supplies fuel is in the intake position of its cycle and the other cylinder of the same pair is in the power stroke position of its cycle. At this same time, the pistons in the cylinders of the other pair are going through exhaust and compression strokes, respectively. Thus, as shown in the drawing, pump 12 is supplying fuel to line 18 and hence, to the nozzles 11 of cylinders 1 and 4. Since cylinder 1 is on its power stroke with very high gaseous pressure therein, the fuel pressure in line 18 takes the path of least resistance through the injection nozzle 11 of cylinder 4. During the next revolution of the crankshaft, and hence the next injection stroke of pump 12, the gas pressure conditions in cylinders 1 and 4 will be reversed so that the injection will take place in cylinder 1 which is then on its intake stroke. Fuel is alternately supplied to cylinders 2 and 3 in like manner and in properly timed relation with the injections in cylinders 1 and 4. Thus, a single pump is used without a distributor to supply metered quantities of fuel in succession to a plurality of engine cylinders, novel advantage being taken of the relatively wide variations of the pressure differential between the fuel line pressure and the gaseous pressures in the several cylinders. In engines having a larger number of cylinders, an additional fuel pump and cam therefor may be provided for each additional set of cylinders.

Figure 4:
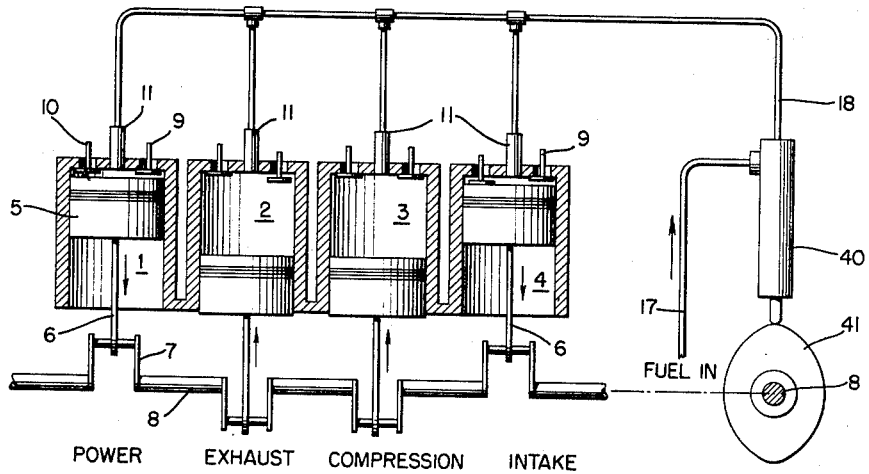
Fig. 4 is a diagrammatic view showing parts of a four-stroke cycle engine and another form of fuel injection system thereof embodying the present invention.

If desired, the output of a single fuel injection pump may be connected to directly supply all four of the injection nozzles 11 in a four-stroke cycle engine. Such system is shown diagrammatically in Fig. 4, wherein a pump 40 periodically delivers fuel under pressure into the common fuel line 18. Pump 40 is actuated at higher speed in relation to engine speed by a two-lobe cam 41 having the lobes spaced 180° apart. On each pressure or injection stroke of the pump, the resistance to nozzle valve opening and flow into the cylinder in which the piston is on its intake stroke will be sufficiently less than the resistance created by the higher gas pressures in the other three cylinders to permit injection to take place only in the cylinder which is taking in a fresh supply of air. This results from the fact that the pintle nozzle valves which control flow from the fuel line into the cylinders must be opened by the fuel pressure against the gas pressure existing in the cylinder.

Figure 5:
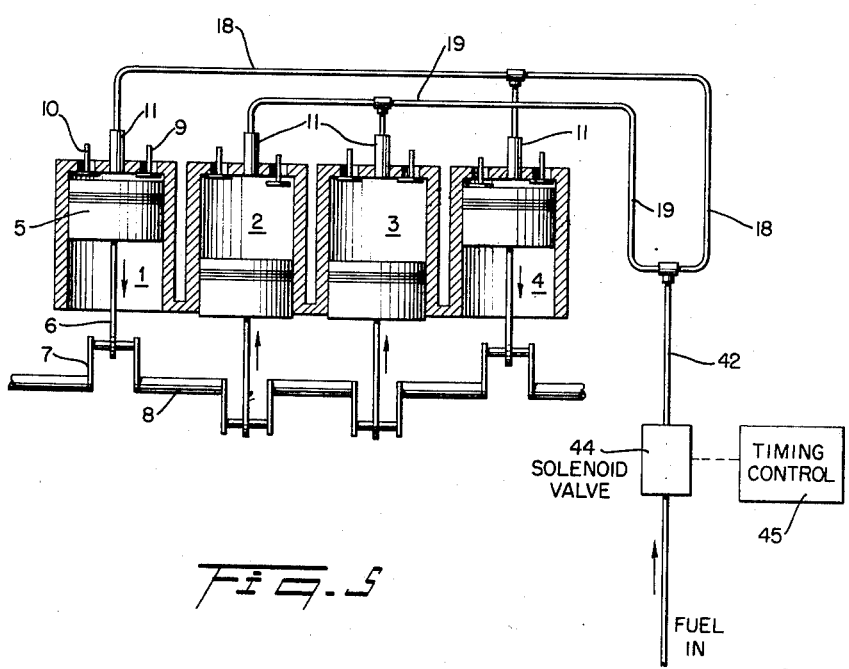
Fig. 5 is a diagrammatic view showing parts of a four-stroke cycle engine and yet another form of fuel injection system therefor embodying the present invention.

It will be understood that other known means may be provided in lieu of one or more fuel pumps to control and meter the fuel flow from the supply line to the several engine cylinders. For example, the fuel in the supply line may be kept under a suitable injection pressure sufficient to actuate the valves of nozzles 11, and flow from the supply line to each fuel line, such as lines 18 and 19, may be controlled by one or more normally closed solenoid actuated valves. A typical system of this type is shown in Fig. 5, wherein one solenoid valve 44 is shown controlling the flow of fuel under pressure to a common fuel line 42, from which it is delivered to fuel lines 18 and 19. The energization of the latter to effect timed injections of suitable duration, to provide desired metering, is controlled by suitable electrical and mechanical means operatively associated with the engine. One suitable control means of this type is disclosed in Sutton et al. application Serial No. 637,852, filed February 4, 1957. The solenoid metering valve or valves when used in the present disclosure would control flow from a common fuel supply line into a fuel line and thence to the injection nozzles 11 rather than controlling flow directly into the engine cylinder, as in the above referred to application. A single solenoid valve could be used to control flow from the supply line into all four of the cylinders of the engine illustrated in Fig. 1, in the same manner that a single pump may be used as described above.

Figure 2:
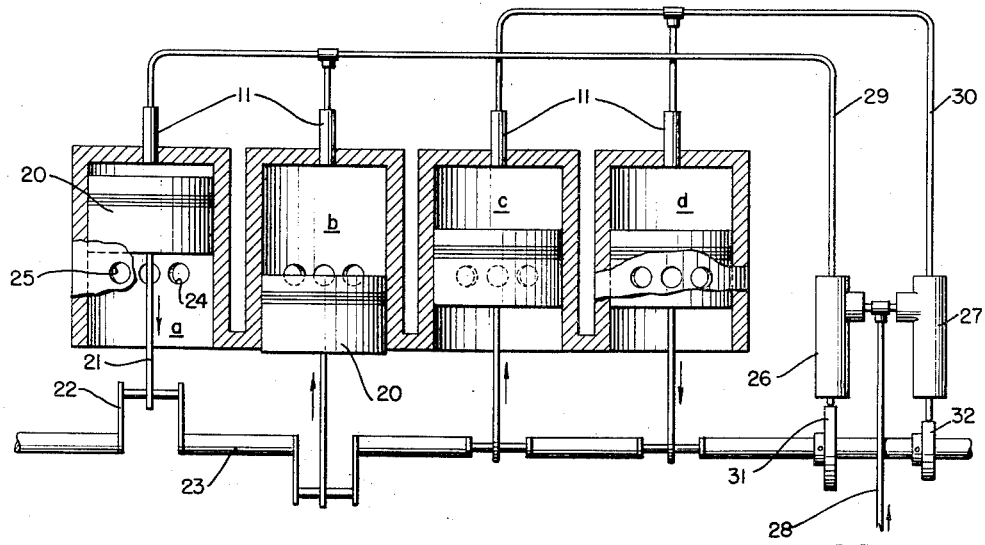
Fig. 2 is a similar view showing a two-stroke cycle engine and a fuel injection system according to the invention.

The invention is also applicable to two-stroke cycle engines as diagrammatically illustrated in Fig. 2, wherein two sets of two cylinders a, b and c, d are shown. The pistons 20 in each set of cylinders are connected by rods 21 to cranks 22. The cranks of each of the first pair, a and b, and the second pair, c and d, of cylinders are displaced 180° from each other on crankshaft 23. The cranks 22 for cylinders a and b are displaced 90° from the cranks for cylinders c and d. In an engine having a larger number of cylinders working in sets of two, the pairs of cranks would be displaced by an angular amount equal to 360° divided by the number of pairs of cylinders.

In a manner well understood in the art fresh air is supplied to the cylinders above pistons 20 through ports 24 in one side of the cylinder and burned gases are exhausted therefrom through ports 25 in the opposite wall of the cylinder. These ports are opened and closed by the pistons. Fuel is supplied to the cylinders through pintle type nozzles 11 mounted in the cylinder heads.

Each of a pair of single cylinder plunger pumps 26 and 27 supplies fuel from a supply line 28 to a pair of cylinders as described above through fuel lines 29 and 30, respectively. Inasmuch as a charge of fuel must be supplied to each cylinder during each revolution of the crankshaft, the injection pumps are operated by two-lobe cams 31 and 32. The lobes on each cam are spaced 180° apart and one cam is angularly offset 90° with respect to the other in the illustrated embodiment. This condition will differ in engines with a larger number of cylinders. For example, in a six-cylinder engine having its cylinders functioning in sets of two, three pumps may be used with operating cams offset 120° from each other.

By considering cylinders a and b which are supplied by pump 26, it will be seen that fuel pumped to line 29 will enter cylinder b into which fresh air is entering through ports 24 preparatory to the upward or compression stroke of the piston 20. This results, as pointed out above, from the fact that there is a greater pressure differential existing between the fuel line pressure and the pressure in cylinder b than that existing between the fuel line pressure and the pressure in cylinder a, which is beginning its power stroke following ignition of the compressed combustible mixture therein. When the crankshaft and cam 31 have made a half revolution, the same pump 26 will inject fuel into cylinder a since the conditions in cylinders a and b will then be reversed. Pump 27 supplies fuel to cylinders c and d in like manner at intervals offset 90° of crankshaft rotation from the injections into cylinders a and b. The firing order for the cylinders in Fig. 2 would be as follows: a—c—b—d.

One fuel injection pump may also serve four cylinders of a two-stroke cycle engine arranged as shown in Fig. 2 when the pump is driven by a cam with four equally spaced lobes. When injection takes place, one cylinder, such as cylinder a, is beginning its power stroke, another such as cylinder c is on its compression stroke, and a third such as cylinder d is completing its power stroke. Thus, the high pressure of the gases in the three cylinders on power and compression strokes will cause the fuel to flow into the fourth cylinder such as cylinder b which is at that time taking in fresh air at relatively low pressure.

Suitable ignition means are, of course, provided as mentioned in connection with Fig. 1 for initiating the combustion of the fuel-air mixture in the cylinders. Pumps 26 and 27 may also be replaced by one or more suitably controlled solenoid operated valves and control means therefor, as above described in connection with Fig. 1, when fuel in supply line 28 is maintained under suitable pressure capable of actuating the valves of injection nozzles 11.

Although only a limited number of embodiments of the invention have been illustrated in the accompanying drawings and described in the foregoing specification, it is to be expressly understood that various changes, such as in the relative dimensions of the parts, materials used, and the like as well as in the suggested manner of use of the apparatus of the invention, may be made therein without departing from the spirit and scope of the invention as will now be apparent to those skilled in the art.

What is claimed is:

1. Apparatus for solid injecting metered quantities of liquid fuel into the cylinders of an engine having a plurality of cylinders which are periodically alternately subjected during the operating cycle to low pressure and high pressure, said engine having its cylinders arranged in at least one set having their power impulses spaced over the operating cycle, the air intake portions of the cycle of the respective cylinders being spaced over the operating cycle, only one cylinder of the set taking in air at substantially any one time, the pressure within each cylinder being low during its air intake period, the pressure within each of the other cylinders of the set being relatively high during such period, said apparatus comprising a common fuel line connected to the fuel intake of each cylinder of the set, each cylinder having a fuel intake which is so constructed and arranged that fuel may flow therethrough into the respective cylinders only during periods of low pressure therein, each fuel intake comprising a valve responsive to pressure within the cylinder which is prevented from opening when the pressure in the cylinder is relatively high, and means for periodically subjecting the fuel in the common fuel line to fuel injecting pressure, such fuel being under pressure during the fuel intake periods of each of the cylinders of the set.

2. Apparatus as claimed in claim 1 comprising a pump operated in timed relation to the engine for periodically subjecting the fuel in the common fuel line to pressure.

3. Apparatus as claimed in claim 1 wherein the valve is so constructed and arranged that it is closed at all times except when the cylinder is taking in air.

4. Apparatus as claimed in claim 1 wherein the engine is a four stroke cycle engine and each set of cylinders consists of two cylinders, the cylinders in each set being so constructed and arranged that when one cylinder takes in air the other cylinder fires.

5. Apparatus as claimed in claim 4 comprising a pump operated in timed relation to the engine for periodically subjecting the fuel in the common fuel line to pressure.

6. Apparatus as claimed in claim 1 wherein the engine is a two stroke cycle engine and each set of cylinders consists of two cylinders, the cylinders in each set being so constructed and arranged that when one cylinder takes in air the other cylinder fires.

7. Apparatus as claimed in claim 6 comprising a pump operated in timed relation to the engine for periodically subjecting the fuel in the common fuel line to pressure.

8. The method of solid injecting metered quantities of liquid fuel into the cylinders of an engine having a plurality of cylinders which are periodically alternately subjected during the operating cycle to low pressure and high pressure, said engine having its cylinders arranged in at least one set having their power impulses spaced over the operating cycle, the air intake portions of the cycle of the respective cylinders being spaced over the operating cycle, only one cylinder of the set taking in air at any one time, the pressure within each cylinder being low during its air intake period, the pressure within each of the other cylinders of the set being relatively high during such period, said method comprising feeding the cylinders of said set with fuel from a common fuel line through which fuel flows into the respective cylinders during periods of low pressure therein and simultaneously blocking the flow of fuel into the other cylinders of the set, periodically subjecting the fuel in the common fuel line to fuel injecting pressure at times coinciding with the fuel intake periods of each of the cylinders of the set, and interposing a barrier to the flow of fuel from the common fuel line into each cylinder during the periods of high pressure in the cylinder.

9. The method as claimed in claim 8 comprising operating each of the said barriers by the pressure within the respective cylinders.

10. The method as claimed in claim 8 wherein the engine is a four stroke cycle engine and each set of cylinders consists of two cylinders, the cylinders in each set being so constructed and arranged that when one cylinder takes in air the other cylinder fires.

11. The method as claimed in claim 8 wherein the engine is a two stroke cycle engine and each set of cylinders consists of two cylinders, the cylinders in each set being so constructed and arranged that when one cylinder takes in air the other cylinder fires.

References Cited in the file of this patent

UNITED STATES PATENTS

| | | |
|---|---|---|
| 1,737,813 | Tice | Dec. 3, 1929 |
| 2,392,591 | Hurst | Jan. 8, 1946 |